US010655540B2

United States Patent
Carretero Benignos et al.

(10) Patent No.: US 10,655,540 B2
(45) Date of Patent: May 19, 2020

(54) APPARATUS AND SYSTEMS FOR A SURFACE COOLER HAVING PLIANT FINS

(71) Applicant: General Electric Company, Schenectady, NY (US)

(72) Inventors: Jorge Alejandro Carretero Benignos, Bavaria (DE); William Joseph Antel, Jr., Aberdeenshire (GB); William Dwight Gerstler, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 902 days.

(21) Appl. No.: 15/282,348

(22) Filed: Sep. 30, 2016

(65) Prior Publication Data

US 2018/0094583 A1    Apr. 5, 2018

(51) Int. Cl.
| | | |
|---|---|---|
| *F02C 7/14* | (2006.01) | |
| *F28D 7/00* | (2006.01) | |
| *F28F 1/02* | (2006.01) | |
| *F28D 1/047* | (2006.01) | |

(Continued)

(52) U.S. Cl.
CPC .............. *F02C 7/14* (2013.01); *F28D 1/0366* (2013.01); *F28D 1/0471* (2013.01); *F28D 7/005* (2013.01); *F28F 1/022* (2013.01); *F28F 3/022* (2013.01); *F05D 2260/213* (2013.01);
(Continued)

(58) Field of Classification Search
CPC ...... F02C 7/12; F02C 7/14; F02C 7/18; F02C 7/185; F04D 29/582; F01D 25/12; F28D 1/022; F28D 1/0366; F28D 1/0471; F28D 7/005; F05D 2260/213; F05D 2260/22141; F05D 2260/98; Y02T 50/672;
(Continued)

(56) References Cited

U.S. PATENT DOCUMENTS

| | | |
|---|---|---|
| 4,311,193 A | 1/1982 | Verhaeghe et al. |
| 4,964,458 A | 10/1990 | Flint et al. |
| 5,201,866 A | 4/1993 | Mok |

(Continued)

FOREIGN PATENT DOCUMENTS

| | | |
|---|---|---|
| CN | 1412840 A | 4/2003 |
| CN | 204707389 U | 10/2015 |

(Continued)

OTHER PUBLICATIONS

A Chinese language Office Action, and an English language translation, dated Feb. 11, 2019, for related CN patent application No. CN 201710907402.3.

(Continued)

*Primary Examiner* — Mark A Laurenzi
*Assistant Examiner* — Loren C Edwards
(74) *Attorney, Agent, or Firm* — Armstrong Teasdale LLP

(57) ABSTRACT

A surface cooler includes a conduit, a body having an external surface, and a plurality of fin members arranged in an array of fin members. The conduit defines an inlet, an outlet, and an internal flow path extending between the inlet and the outlet. The conduit is configured to channel a flow of fluid to be cooled from the inlet to said outlet. The conduit extends through the body. Each fin member of the array of fin members extends from the external surface of the body. Each fin member is fabricated from a thermally conductive, resilient, and pliable material.

20 Claims, 7 Drawing Sheets

(51) Int. Cl.
　　　*F28D 1/03*　　　(2006.01)
　　　*F28F 3/02*　　　(2006.01)
(52) U.S. Cl.
　　　CPC .............. *F05D 2260/22141* (2013.01); *F05D 2260/98* (2013.01); *Y02T 50/672* (2013.01); *Y02T 50/676* (2013.01)
(58) Field of Classification Search
　　　CPC . Y02T 50/676; F28F 3/02; F28F 3/022; F28F 3/04
　　　USPC .......................................................... 60/267
　　　See application file for complete search history.

(56) References Cited

U.S. PATENT DOCUMENTS

| | | | |
|---|---|---|---|
| 6,026,895 A * | 2/2000 | Moresco | H01L 23/3672 165/185 |
| 6,223,814 B1 | 5/2001 | Moresco et al. | |
| 7,399,919 B2 * | 7/2008 | McCutcheon | F28D 15/0241 174/16.3 |
| 7,422,051 B2 | 9/2008 | Sinha | |
| 9,171,983 B2 | 10/2015 | Tseng et al. | |
| 2005/0047932 A1 * | 3/2005 | Nakae | F23R 3/002 417/313 |
| 2014/0027102 A1 * | 1/2014 | Antel, Jr. | B23P 15/26 165/185 |
| 2015/0135726 A1 | 5/2015 | Hundley, Jr. et al. | |

FOREIGN PATENT DOCUMENTS

| | | |
|---|---|---|
| CN | 105492524 A | 4/2019 |
| JP | S5653395 A | 5/1981 |

OTHER PUBLICATIONS

Nepf, Heidi M., "Hydrodynamics of vegetated channels," Journal of Hydraulic Research, vol. 50, No. 3, 2012, pp. 262-279, retrieved from website http://dx.doi.org/10.1080/00221686.2012.696559.

Luhar, Mitul, "Analytical and Experimental Studies of Plant-Flow Interaction at Multiple Scales," Doctoral Dissertation, Massachusetts Institute of Technology (MIT), Sep. 2012 (171 pg.).

* cited by examiner

APPARATUS AND SYSTEMS FOR A SURFACE COOLER HAVING PLIANT FINS

BACKGROUND

The field of the disclosure relates generally to gas turbine engines and, more particularly, to systems and apparatus for surface coolers in a gas turbine engine.

At least some known gas turbine engines include one or more oil cooling systems that are configured to cool and lubricate components of gas turbine engines. Some gas turbine engines include an air-oil surface cooler, or heat exchanger, attached to, for example, surfaces of an aircraft, such as the nacelle, or outer surfaces of the gas turbine engine. Such air-oil surface coolers use fan air and/or external air to cool the oil flowing through the air-oil surface cooler. Known air-oil surface coolers include rigid fins that protrude into a bypass airflow passageway of the gas turbine engine. The rigid fins facilitate transferring heat from the heated oil to the relatively cool fan air.

Some known air-oil surface coolers, however, are inefficient due to the use of rigid materials. For example, in some known gas turbine engines, the cooling fluid flow angle changes direction based in part on the operating conditions of the gas turbine engine. The rigid materials used in known air-oil surface coolers have a fixed and rigid geometry, which facilitates generating pressure loses and friction losses to the changing flow angle of the cooling fluid flowing through the bypass airflow passageway, which reduces the fuel efficiency of the engine.

In addition, some known air-oil surface coolers are sized to remove a predetermined amount of heat from the oil. However, known gas turbine engines operate at a range of engine speeds. For example, at a ground/idle state, fan air flows through the nacelle at a reduced flow rate, and at a steady state cruising condition, fan air flows through the nacelle at an increased flow rate. Thus, to remove the predetermined amount of heat at reduced fan air flow rates, known air-oil surface coolers have an increased size and thus weight, as opposed to that which would be needed at increased fan air flow rates. The increased size of the air-oil surface coolers facilitates increased friction losses when exposed to the increased fan air flow rates.

BRIEF DESCRIPTION in one aspect, a surface cooler is provided. The surface cooler includes a conduit defining an inlet, an outlet, and an internal flow path extending therebetween. The conduit is configured to channel a flow of fluid to be cooled from the inlet to the outlet. In addition, the surface cooler includes a body having an external surface. The conduit extends through the body. The surface cooler also includes a plurality of fin members configured in an array of fin members. Each fin member of the plurality of fin members extends away from the external surface. Each fin member is fabricated from a thermally conductive, resilient, and pliable material.

In another aspect, a gas turbine engine is provided. The gas turbine engine includes a fan assembly including a bypass airflow passage. In addition, the gas turbine engine includes a core engine having a surface cooler. The surface cooler includes a conduit defining an inlet, an outlet, and an internal flow path extending therebetween. The conduit is configured to channel a flow of fluid to be cooled from the inlet to the outlet. In addition, the surface cooler includes a body having an external surface. The conduit extends through the body. The surface cooler also includes a plurality of fin members configured in an array of fin members. Each fin member of the plurality of fin members extends away from the external surface. Each fin member is fabricated from a thermally conductive, resilient, and pliable material. The array of fin members extends into the bypass airflow passage.

DRAWINGS

These and other features, aspects, and advantages of the present disclosure will become better understood when the following detailed description is read with reference to the accompanying drawings in which like characters represent like parts throughout the drawings, wherein.

Figure 1:
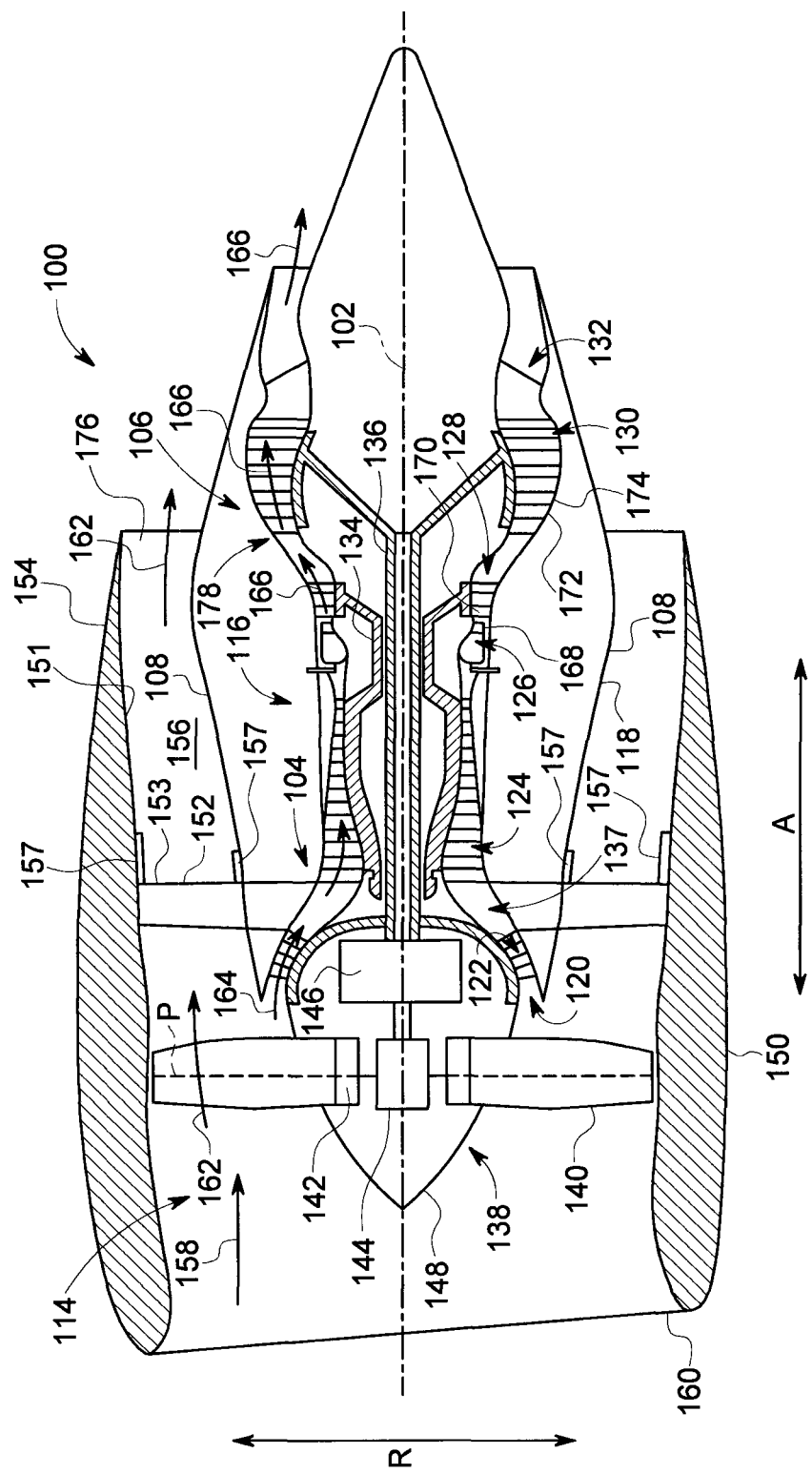
FIG. 1 is a schematic cross-sectional view of an exemplary gas turbine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The following detailed description illustrates embodiments of the disclosure by way of example and not by way of limitation. Although described herein as associated with surface coolers for use in gas turbine engines, it is contemplated that the systems and apparatus described in the disclosure have general application to systems and apparatus associated with other coolers and/or heat exchangers.

Embodiments of the surface cooler assembly described herein removes heat from, i.e., cools oil and/or other fluids in a gas turbine engine assembly. A nacelle at least partially surrounding the gas turbine engine forms a fan bypass airflow passage therebetween. The surface cooler assembly includes an air-oil surface cooler located, in one example, on an inner radial surface of the nacelle or on an outer radial surface of the gas turbine engine exposed to air flowing through the fan bypass airflow passage. In addition, in some example, the surface cooler is mounted on an external surface of an aircraft, exposed to an external airflow. The air-oil surface cooler includes a first flow path for channeling oil through the surface cooler internal passages and an external surface for directing air proximate to fins on the external surface. The fins disposed on the external surface of the surface cooler protrude into the fan bypass airflow passage. The surface cooler cools the oil by exchanging heat in the oil flowing through the first flow path with fan air in the fan bypass airflow passage. Additionally, outlet guide vanes extending between the nacelle and the gas turbine engine direct the flow of air through the nacelle. The oil flows through the first flow path and the air flows proximate the fins on the external surface. The fins on the external surface of the surface cooler are pliant and resilient, able to move and bend in the direction of the air flow through the outlet guide vanes to facilitate directing air flow through the fan bypass airflow passage efficiently to reduce fan air pressure losses.

The surface cooler assemblies described herein offer advantages over known methods of cooling oil or other fluids in a gas turbine engine. More specifically, some known surface coolers include rigid fins on the surface of the surface cooler oriented in one direction regardless of the direction the outlet guide vanes are directing air flow. The fins on the external surface of the surface coolers described herein, however, direct air flow in the same direction as the outlet guide vanes to facilitate reducing pressure losses and friction losses, i.e., drag, thereby facilitating increasing a fuel efficiency of the gas turbine engine. In addition, the fins on the external surface of the surface coolers described herein facilitate decreasing friction losses or drag at increased air flow rates through the gas turbine engine.

FIG. 1 is a schematic cross-sectional view of an exemplary gas turbine engine 100. In the exemplary embodiment, gas turbine engine 100 is a high bypass turbofan engine. Turbofan engine 100 defines an axial direction A (extending parallel to a longitudinal axis 102 provided for reference) and a radial direction R, extending perpendicular to axial direction A. Turbofan engine 100 includes a fan assembly 114 and a core turbine engine 116 disposed downstream from fan assembly 114.

In the exemplary embodiment, core turbine engine 116 includes a generally tubular outer casing 118 that defines an annular inlet 120. Outer casing 118 encases, in serial flow relationship, a compressor section 104 including a booster or low pressure (LP) compressor 122 and a high pressure (HP) compressor 124; a combustion section 126; a turbine section 106 including a high pressure (HP) turbine 128 and a low pressure (LP) turbine 130; and a jet exhaust nozzle section 132. Outer casing 118 includes an outer radial surface 108. A high pressure (HP) shaft or spool 134 drivingly connects HP turbine 128 to HP compressor 124. A low pressure (LP) shaft or spool 136 drivingly connects LP turbine 130 to LP compressor 122. The compressor section 104, combustion section 126, turbine section 106, and nozzle section 132 together define a core airflow path 137.

In the exemplary embodiment, fan assembly 114 includes a variable pitch fan 138 having a plurality of fan blades 140 coupled to a disk 142 in a spaced relationship. Although fan assembly 114 is described as including a variable pitch fan 138, in alternative embodiments, fan assembly 114 is a conventional fixed pitch fan. In the exemplary embodiment, fan blades 140 extend radially outward from disk 142. Each fan blade 140 is rotatable relative to disk 142 about a pitch axis P by virtue of fan blades 140 being operatively coupled to a suitable pitch change mechanism (PCM) 144 configured to vary the pitch of fan blades 140. In other embodiments, PCM 144 is configured to collectively vary the pitch of fan blades 140 in unison. In the exemplary embodiment, fan blades 140, disk 142, PCM 144, and LP compressor 122 are together rotatable about longitudinal axis 102 by LP shaft 136 across a power gearbox 146.

Disk 142 is covered by a rotatable front hub 148 aerodynamically contoured to promote an airflow through the plurality of fan blades 140. Additionally, exemplary fan assembly 114 includes an annular fan casing or outer nacelle 150 that circumferentially surrounds fan 138 and/or at least a portion of core turbine engine 116. Nacelle 150 includes an inner radial surface 151. In the exemplary embodiment, nacelle 150 is configured to be supported relative to core turbine engine 116 by a plurality of circumferentially-spaced outlet guide vanes 152. Moreover, a downstream section 154 of nacelle 150 extends over an outer portion of core turbine engine 116 so as to define a bypass airflow passage 156 therebetween. A plurality of surface coolers 157 is disposed on an inner radial surface 151 of nacelle 150 in bypass airflow passage 156 aft of outlet guide vanes 152. In an alternative embodiment, surface coolers 157 are disposed on, for example, outer radial surface 108 of outer casing 118 aft of outlet guide vanes 152 or on guide vanes 152, such as at a trailing edge 153. In the exemplary embodiment, surface coolers 157 are disposed on inner radial surface 151 of nacelle 150 or outer radial surface 108 of outer casing 118 in bypass airflow passage 156 aft of outlet guide vanes 152 less than 2 inches from trailing edge 153 of outlet guide vanes 152. However, in some embodiments, surface coolers 157 are disposed on inner radial surface 151 of nacelle 150 or outer radial surface 108 of outer casing 118 in bypass airflow passage 156 at any location that enables surface coolers 157 to operate a described herein. Surface coolers 157 are configured to channel a flow of fluid through internal conduits to cool the fluid with airflow in bypass airflow passage 156. In exemplary embodiment, the fluid cooled by surface coolers 157 is oil. Alternatively, surface coolers 157 are configured to cool fuel or any other suitable fluid.

During operation of turbofan engine 100, a volume of air 158 enters turbofan engine 100 through an associated inlet 160 of nacelle 150 and/or fan assembly 114. As a volume of air 158 passes across fan blades 140, a first portion 162 of air 158 is directed or routed into bypass airflow passage 156, and a second portion 164 of air 158 is directed or routed into core airflow path 137, or more specifically into LP compressor 122. First portion 162 of air 158 flows proximate to a surface of surface coolers 157 and acts as a flow of coolant to cool oil within surface coolers 157. A ratio between first portion 162 of air 158 and second portion 164 of air 158 is commonly known as a bypass ratio. The pressure of second portion 164 of air 158 is increased as it is routed through HP compressor 124 and into combustion section 126, where it is mixed with fuel and burned to provide combustion gases 166.

Combustion gases 166 are routed through HP turbine 128 where a portion of thermal and/or kinetic energy from combustion gases 166 is extracted via sequential stages of HP turbine stator vanes 168 that are coupled to outer casing 118 and HP turbine rotor blades 170 that are coupled to HP shaft or spool 134, thus causing HP shaft or spool 134 to rotate, which drives a rotation of HP compressor 124. Combustion gases 166 are then routed through LP turbine 130 where a second portion of thermal and kinetic energy is extracted from combustion gases 166 via sequential stages of LP turbine stator vanes 172 that are coupled to outer casing 118 and LP turbine rotor blades 174 that are coupled to LP shaft or spool 136, which drives a rotation of LP shaft or spool 136, LP compressor 122, and rotation of fan 138 across power gearbox 146.

In the exemplary embodiment, combustion gases 166 are routed through jet exhaust nozzle section 132 of core turbine engine 116 to provide propulsive thrust. Simultaneously, the pressure of first portion 162 of air 158 is increased as first portion 162 of air 158 is routed through bypass airflow passage 156 before it is exhausted from a fan nozzle exhaust section 176 of turbofan engine 100, also providing propulsive thrust. HP turbine 128, LP turbine 130, and jet exhaust nozzle section 132 at least partially define a hot gas path 178 for routing combustion gases 166 through core turbine engine 116.

As discussed above, turbofan engine 100 shown in FIG. 1 is by way of example only, and in other embodiments, turbofan engine 100 may have any other suitable configuration. In still other alternative embodiments, aspects of the present disclosure may be incorporated into all other suitable gas turbine engines. For example, and without limitation, aspects of the present disclosure may be incorporated into, e.g., a turboprop engine. In addition, in other embodiments, turbofan engine 100 is an unducted fan engine with surface coolers 157 disposed on radial outer surface 108 of outer casing 118.

Figures 2, 3:
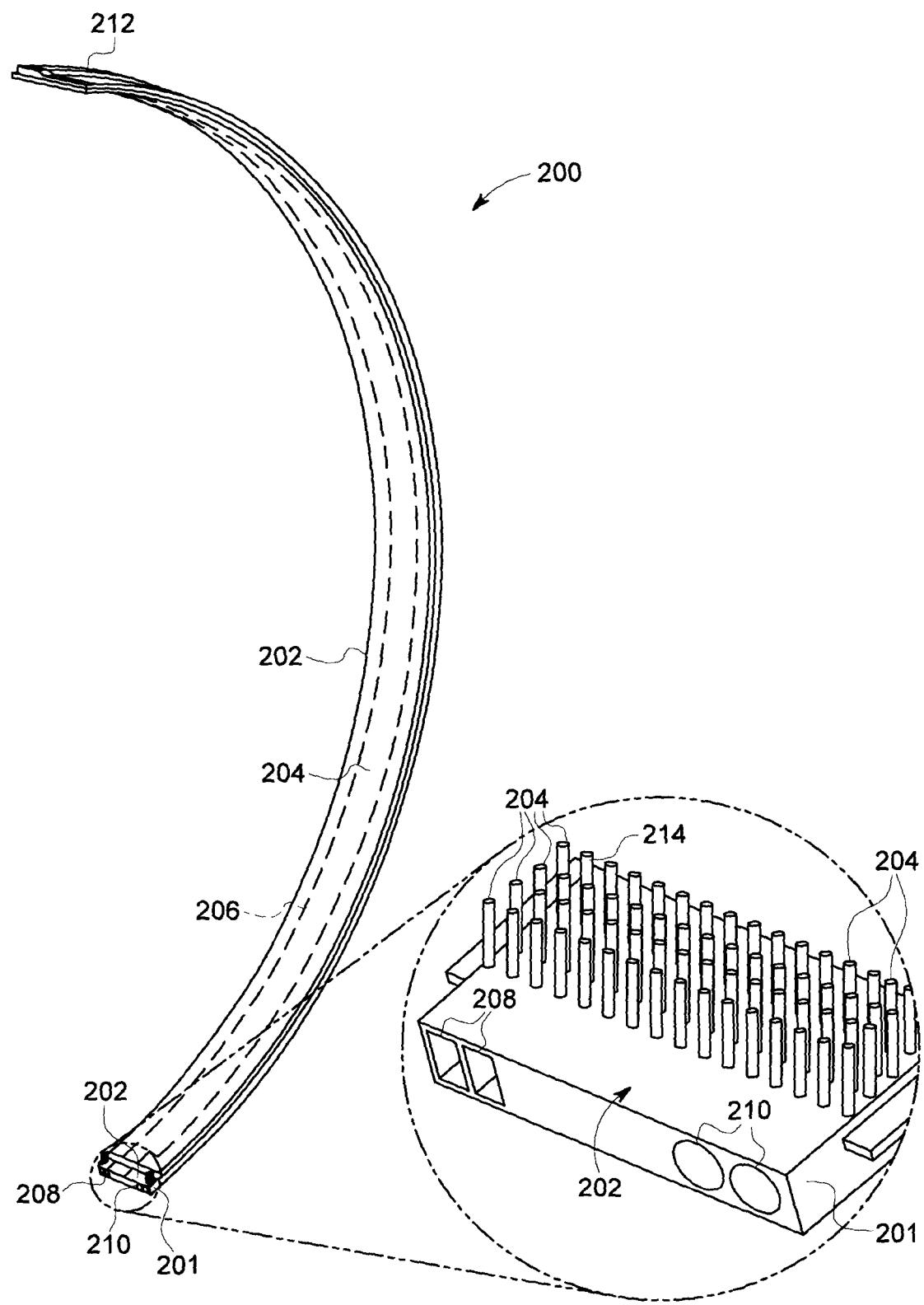
FIG. 2 is a schematic diagram of a surface cooler for use in the gas turbine engine of FIG. 1.
FIG. 3 is an enlarged schematic diagram of a surface cooler inlet and outlet of the surface cooler of FIG. 2.

FIG. 2 is a schematic diagram of a surface cooler 200 for use in turbofan engine 100 (shown in FIG. 1). FIG. 3 is an enlarged schematic diagram of surface cooler 200, inlet 208, and outlet 210. In the exemplary embodiment, surface cooler 200 includes a body 201 having an external surface 202 disposed at inner radial surface 151 (shown in FIG. 1) of nacelle 150 (shown in FIG. 1). In an alternative embodiment, surface cooler 200 includes external surface 202 disposed at outer radial surface 108 (shown in FIG. 1) of outer casing 118 (shown in FIG. 1). In the exemplary embodiment, surface cooler 200 also includes a surface 212 opposite external surface 202. In addition, surface cooler 200 also includes an array of fin members 204 disposed on or embedded in external surface 202 and extending away therefrom into bypass airflow passage 156 (shown in FIG. 1). Surface cooler 200 also includes one or more conduits 203 defined by surface cooler inlets 208, one or more surface cooler outlets 210, and one or more internal flow paths 206 extending therebetween. It is noted that surface cooler 200 is an exemplary surface cooler or heat exchanging device, and that any type and configuration of the surface cooler that enables the array of fin members 204 to function as described herein can be used.

In the exemplary embodiment, the fin members 204 are generally cylindrical in shape and are referred to as pin fins, such that the array of fin members 204 constitutes a pin-fin array. While shown as having a generally circular cross-section, fin members 204 have any cross-sectional shape that enables surface cooler 200 to function as described herein. For example, and without limitation, alternative embodiments of fin members 204 have an oval cross-section, a rectangular cross-section, and a polygonal cross-section.

Fin members 204 are fabricated from a resilient and pliable, or pliant, material 214 to facilitate flexing, twisting, or bending in response to a fluid, such as air, flowing across the fin members 204. In addition, material 214 is a thermally conductive material, having a thermal conductivity suitable for use in surface cooler 200. Material 214 can include, for example, and without limitation, composite materials, polymers, metals (such as superelastic alloys), and any other material or material combination that enables fin members 204 to function described herein. It was determined that a suitable material 214 for a viable pliant fin surface cooler 200 is pliant, having a Young's modulus less than $1 \times 10^9$ Pascal (Pa), and thermally conductive, having a thermal conductivity greater than about 1 watt per meter kelvin (W/m-K). Preferably, material 214 has a Young's modulus less than about $1 \times 10^8$ Pa and a thermal conductivity greater than about 10 W/m-K. In addition, material 214 is resilient such that material 214 returns or springs back into its original position and/or shape after bending, twisting, and/or flexing.

It is noted, however, that according to known material databases, there are no traditional materials that have both a high thermal conductivity (greater than, for example, 10 W/m-K) and a low Young's modulus (less than, for example, $1 \times 10^8$ Pa). Thus, in the exemplary embodiment, it was determined that a material composition including a polymer mixed with thermally conductive particles (e.g., carbon fibers or ceramic particles) is sufficiently thermally conductive while being sufficiently pliant. For example, and without limitation, in one embodiment, material 214 includes a silicone elastomer matrix having a volume fraction of about 30 percent combined with a silicon carbide particulate having a volume fraction of about 70 percent. In the exemplary embodiment, the properties of material 214 includes a Young's modulus in the range between, and inclusive of, about $2.5 \times 10^7$ Pa to about $6 \times 10^7$ Pa, and a thermal conductivity in the range between, and inclusive of, about 4.67 W/m-K to about 80.5 W/m-K. Fabricating surface cooler 200 with resilient and pliant fin members 204 facilitates surface cooler 200 having a flexible structure that adapts to changing flow conditions, which facilitates reducing drag by reducing an effective frontal area of surface cooler 200 as a flow rate of fluid increases.

Figure 4:
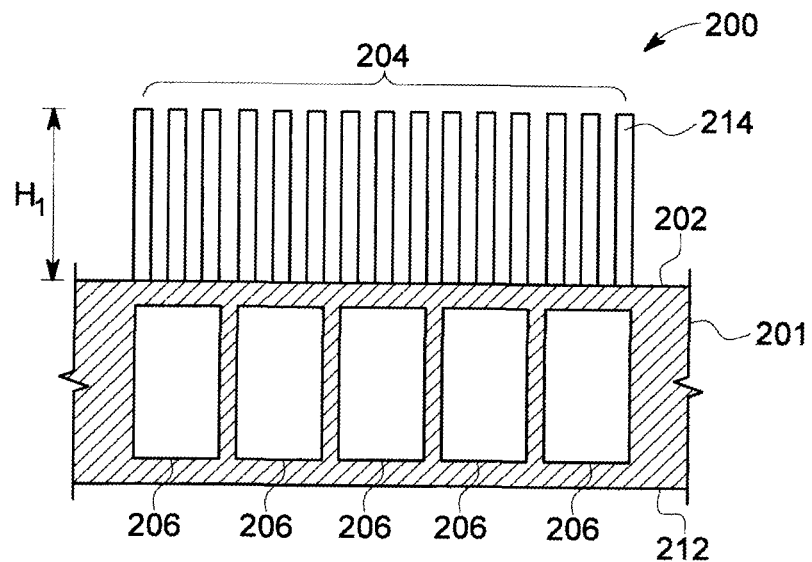
FIG. 4 is a schematic axial view of a portion of the surface cooler of FIG. 2, shown in a first orientation.
Figure 5:
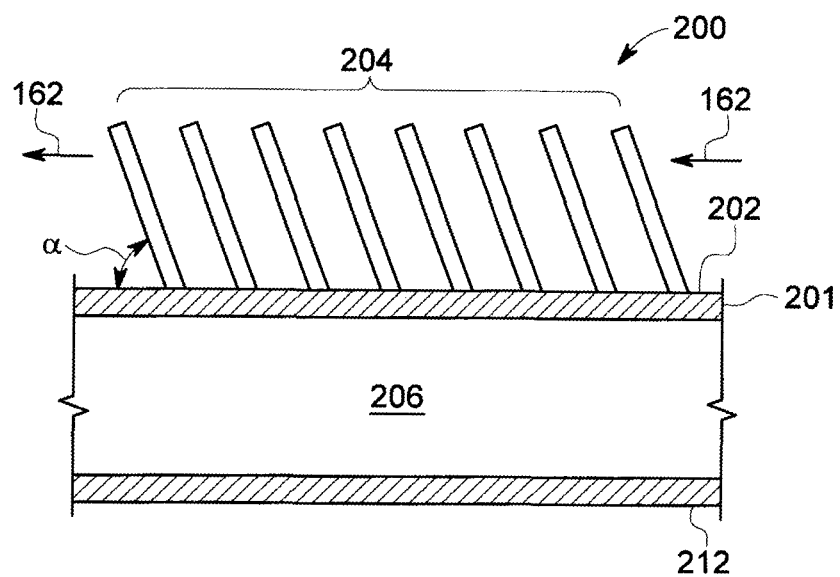
FIG. 5 is a schematic radial view of a portion of the surface cooler of FIG. 2, shown in the first orientation.

FIG. 4 is a schematic axial view of a portion of surface cooler 200 in a first orientation. FIG. 5 is a schematic radial view of a portion of surface cooler 200 in the first orientation. In the exemplary embodiment, internal flow paths 206 are defined within body 201 between external surface 202 and surface 212 opposite external surface 202. The plurality of fin members 204, formed from material 214, are disposed on or embedded in external surface 202 of surface cooler 200. Each internal flow path 206 is associated with three fin members 204 across a width of a respective internal flow path 206, which extend generally vertically away from external surface 202 above each respective internal flow path 206. In alternative embodiment, surface cooler 200 have any number of fin members associated with a respective internal flow path 206. In the exemplary embodiment, each fin member 204 has an effective height substantially equal to height $H_1$ with respect to external surface 202. Height $H_1$ is in the range between, and inclusive of, about 0.25 inches (in.) (6.35 millimeters (mm)) to about 2.0 in (50.8 mm).

As shown in FIG. 5, first portion 162 of air 158 flows across surface cooler 200 and contacts fin members 204 causing them to flex or bend at a first angle α with respect to surface external 202. The first orientation of surface cooler 200 is associated with, for example, and without limitation, a low flow condition of turbofan engine 100, such as a ground/idle state for an electrical generator circuit (not shown) air-cooled oil cooler. For example, and without limitation, in one embodiment, first angle α is in the range between, and inclusive of, about 90° to about 70°. However, first angle α can be any angle that enables surface cooler 200 to function as described herein.

Figure 6:
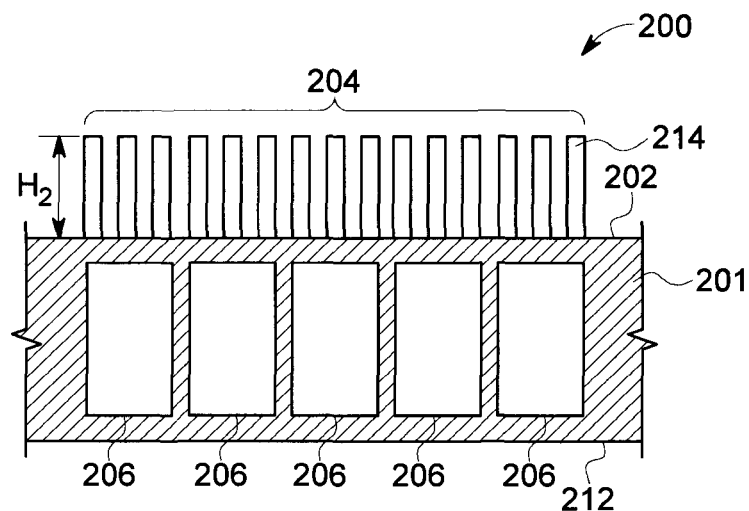
FIG. 6 is a schematic axial view of a portion of the surface cooler of FIG. 2, shown in a second orientation.
Figure 7:
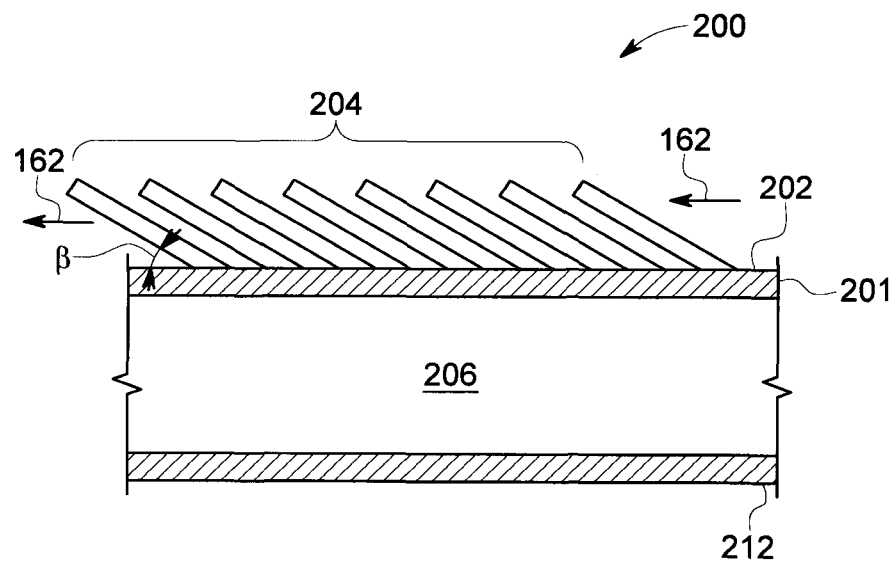
FIG. 7 is a schematic radial view of a portion of the surface of FIG. 2, shown in the second orientation.

FIG. 6 is a schematic axial view of a portion of surface cooler 200 in a second orientation. FIG. 7 is a schematic radial view of a portion of surface cooler 200 in the second orientation. In the exemplary embodiment, internal flow paths 206 are defined within body 201 between external surface 202 and surface 212 opposite external surface 202. The plurality of fin members 204, formed from material 214 are formed with, disposed on, or embedded in external surface 202 of surface cooler 200. Each internal flow path 206 is associated with three fin members 204 across a width of a respective internal flow path 206, which extend generally vertically away from external surface 202 above each respective internal flow path 206. In alternative embodiments, surface cooler 200 have any number of fin members 204 associated with a respective internal flow path 206. In the exemplary embodiment, each fin member 204 has an effective height substantially equal to height $H_2$ with respect to external surface 202. Height $H_2$ is in the range between, and inclusive of, about 0.025 in. (0.635 mm) to about 2.0 in (50.8 mm).

As shown in FIG. 7, first portion 162 of air 158 flows across surface cooler 200 and contacts fin members 204 causing them to flex or bend at a second angle β with respect to external surface 202. In the exemplary embodiment, second angle β is less than first angle α. The second orientation of surface cooler 200 is associated with, for example, and without limitation, a high flow condition of turbofan engine 100, such as a steady state cruising condition for turbofan engine 100. For example, and without limitation, in one embodiment, second angle β is in the range between, and inclusive of, about 70° to about 10°. However, second angle β can be any angle that enables surface cooler 200 to function as described herein.

Figure 8:
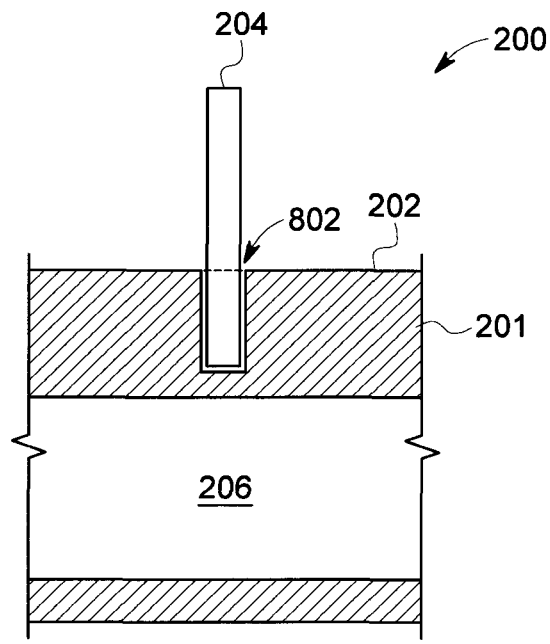
FIG. 8 is an enlarged schematic radial view of a portion of the surface cooler of FIG. 2, showing a fin member mounted to a body of the surface cooler.

FIG. 8 is an enlarged schematic radial view of a portion of surface cooler 200, showing fin member 204 mounted to body 201. In the exemplary embodiment, surface cooler 200 includes a fin member 204 disposed in body 201 and extending from external surface 202. Internal flow path 206 is defined in body 201 below external surface 202 to facilitate transferring heat from a fluid flowing through internal flow path 206 to fin member 204. Body 201 includes a locating aperture 802 formed in external surface 202. Fin member 204 is coupled to locating aperture 802. For example, and without limitation, fin member 204 is coupled to locating aperture 802 via a thermally conductive bond, such as a chemical bond (e.g., an adhesive) or a mechanical bond (e.g., a friction fit). Alternatively, fin member 204 is coupled to locating aperture 802 in any thermally conductive manner that enables surface cooler 200 to function as described herein. In alternative embodiments, fin member 204 is integrally formed with body 201, for example, and without limitation, by a molding process, and extruding process, and an additive manufacturing process.

As described herein, in the exemplary embodiment, fin member 204 is thermally conductive and pliable. In addition, body 201 of surface cooler 200 is fabricated from a thermally conductive material, such as a material that includes, for example, and without limitation, iron, aluminum, a heat dissipation plastic, and one or more ceramic materials.

Figure 9:
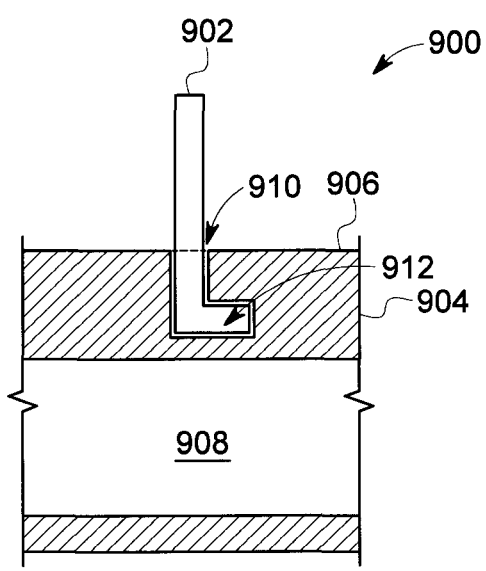
FIG. 9 is an enlarged schematic radial view of a portion of an alternative surface cooler, showing an alternative mounting configuration for a fin member.

FIG. 9 is an enlarged schematic radial view of a portion of a surface cooler 900, showing an alternative mounting configuration for a fin member 902. In this alternative embodiment, surface cooler 900 includes fin member 902 disposed in a body 904 and extending from an upper surface 906 of body 904. An internal flow path 908 is defined in body 904 below surface 906 to facilitate transferring heat from a fluid flowing through internal flow path 908 to fin member 902. Body 904 includes a locating aperture 910 formed in surface 906. Locating aperture 910 has an L-shaped cross section. Fin member 902 includes a coupling portion 912 configured to couple to L-shaped locating aperture 910, such that fin member 902 is fixed in locating aperture 910 by coupling portion 912. Furthermore, fin member 902 is coupled to locating aperture 910 via a thermally conductive bond, such as a chemical bond (e.g., an adhesive) or a mechanical bond (e.g., a friction fit). Alternatively, fin member 902 is coupled to locating aperture 910 in any thermally conductive manner that enables surface cooler 900 to function as described herein. Fin member 902 is thermally conductive and pliable, and is fabricated substantially the same as fin members 204, described herein. Additionally, body 904 of surface cooler 900 is fabricated from a thermally conductive material, such as a material that includes, for example, and without limitation, iron, aluminum, a heat dissipation plastic, and one or more ceramic materials.

With reference to FIGS. 1-7, during operation, first portion 162 of air 158 in bypass airflow passage 156 is configured to flow proximate to external surface 202 to exchange heat with the plurality of fin members 204. Surface cooler inlet 208 is configured to receive a flow of fluid to be cooled, e.g., oil, and channel the fluid to internal flow paths 206. The fluid in internal flow paths 206 exchanges heat with first portion 162 of air 158 through fin members 204. Internal flow paths 206 are configured to channel the fluid to surface cooler outlet 210, which is configured to return the fluid to core turbine engine 116 (shown in FIG. 1). In a low flow condition, such as the first orientation of surface cooler 200, first portion 162 of air 158 is flowing across surface cooler 200 at a reduced flow rate, thereby imparting a reduced amount of force on the plurality of fin members 204. The reduced flow of first portion 162 of air 158 facilitates flexing or bending the plurality of fin members 204 at first angle α with respect to external surface 202. The relatively small first angle α results in a decreased frontal area of the plurality of fin members 204 with respect to known fixed-fin surface coolers, thereby decreasing friction losses or drag, but facilitating increasing a heat transfer rate of surface cooler 200.

As the speed of turbofan engine 100 is increased, for example, and without limitation, during flight of an aircraft using turbofan engine 100, first portion 162 of air 158 flows across surface cooler 200 at an increased flow rate, thereby imparting an increased amount of force on the plurality of fin members 204. The increased flow of first portion 162 of air 158 facilitates flexing or bending the plurality of fin members 204 further to the second orientation, for example, and without limitation, at second angle β with respect to external surface 202. The smaller second angle β results in a decreased frontal area of the plurality of fin members 204 with respect to the low flow condition, thereby facilitating decreasing friction losses or drag, but facilitating decreasing the heat transfer rate of surface cooler 200. In addition, it is noted that the fin members 204 are not constrained to 2-dimensional or planar bending. For example, and without limitation, first portion 162 of air 158 in bypass airflow passage 156 experiences variations in the upstream flow angle from location to location, including swirl conditions. Fin members 204 bend and adapt to the flow conditions and angles, thereby facilitating reducing frictional losses and pressure losses due to channel misalignment with an upstream flow angle.

While the plurality of fin members 204 have been described as bending or flexing (see FIGS. 4-7), it is noted that pliant material 214, as described herein, facilitates flexing, or bending (i.e., flexural stiffness), and twisting (i.e., torsional stiffness) in response to a cooling fluid flowing across fin members 204 (e.g., air). Thus, the plurality of fin members 204 can be constructed to facilitate simultaneous bending and twisting, thereby facilitating increasing a heat transfer area of the surface cooler, while facilitating reducing drag.

Flexural and torsional stiffness of pliant material 214 gauge the resistance of the plurality of fin members 204 to bending and twisting, respectively. Flexural stiffness, or flexural rigidity, of fin members 204 is determined by EI, where E is the Young's modulus of pliant material 214 and I is the second moment of inertia of the cross-section of the plurality of fin members 204. Torsional stiffness, or torsional rigidity, is determined by GJ, where G is the shear modulus of pliant material 214, and J is the polar second moment of inertia of the cross-section of the plurality of fin members 204. The second moment of inertia and the polar second moment of inertia are influenced by its size and cross-sectional shape of the plurality of fin members 204. The twist-to-bend ratio (i.e., EI/GJ) of the plurality of fin members 204 can be determined and adjusted based on the operating requirements of surface cooler 200, for example. An EI/GJ ratio greater than 1.0 indicates that a fin member 204 twists relatively more easily than it bends. An EI/GJ ratio less than 1.0, however, indicates that a fin member 204 favors bending rather than twisting. Adjusting the twist-to-bend ratio of the plurality of fin members 204 facilitates increasing the heat transfer area of surface cooler 200, while facilitating reducing the drag of surface cooler 200, based on the specific operating conditions of the surface cooler.

Figure 10:
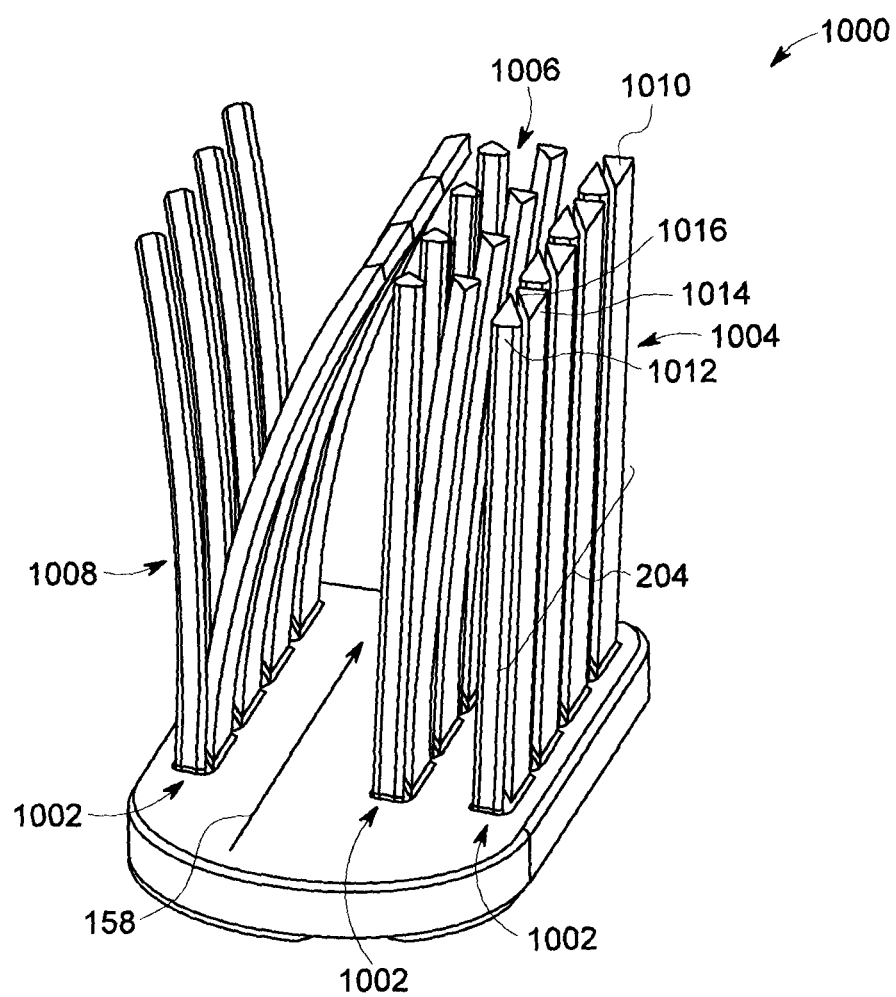
FIG. 10 is a schematic perspective view of a model showing three operating conditions of an alternative fin arrangement for use with the surface cooler of FIG. 2.
Figure 11:
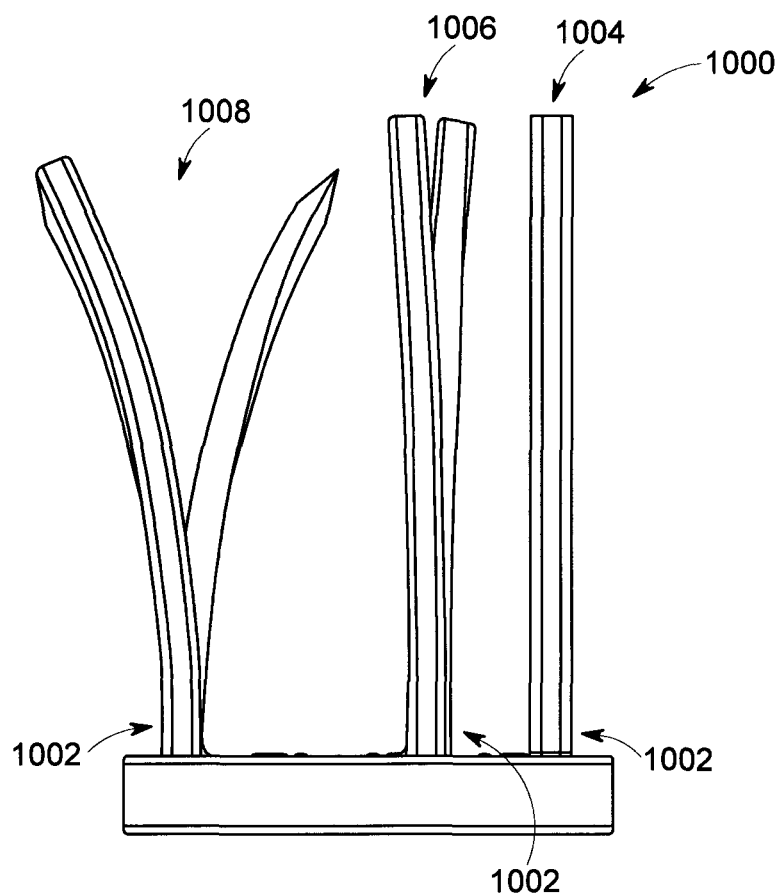
FIG. 11 is a front view of the model of FIG. 10.

FIG. 10 is a schematic perspective view of a model 1000 showing three operating conditions of an alternative fin arrangement 1002 for use with surface cooler 200 (shown in FIG. 2). FIG. 11 is a front view of model 1000 of FIG. 10. In the exemplary embodiment, model 1000 shows fin arrangement 1002 in three different orientations based on different operating conditions: a static orientation 1004 based on a no flow condition; a low flow orientation 1006 based on a low flow or ground/idle operating condition; and a high flow orientation 1008 based on a high flow or steady state cruising condition, for example, for turbofan engine 100. Fin arrangement 1002 is an exemplary row of fin members 204 of surface cooler 200. It is noted that surface cooler 200 includes one or more rows of fin members 204. For example, and without limitation, in one embodiment, surface cooler 200, includes one or more rows of fin arrangement 1002 positioned adjacent each other to define an array of fin members 204. In the exemplary embodiment, fin arrangement 1002 includes a plurality of fin members 204 arranged linearly, generally in alignment with a predominant flow direction of air 158, for example, air 158 flowing generally axially along longitudinal axis 102 of turbofan engine 100 (shown in FIG. 1) through bypass airflow passage 156 (shown in FIG. 1). As shown in FIG. 10, each fin member 204 of fin arrangement 1002 has a generally triangular-shaped cross-section 1010, and is arranged in an alternating pattern with respect to an adjacent fin member 204. For example, and without limitation, adjacent fin members, e.g. a first fin member 1012 and a second fin member 1014 of the plurality of fin members 204 are oriented such that second fin member 1014 is rotated approximately 180° about a longitudinal axis of second fin member 1014 with respect to first fin member 1012. Adjacent first and second fin members 1012 and 1014 are positioned linearly along surface cooler 200 having a gap 1016 defined therebetween. Gap 1016 facilitates air 158 flowing between adjacent first and second fin members 1012 and 1014. Each fin member of the plurality of fin members 204 is arranged substantially similarly to define the array of resilient and pliable fin members 204 for a surface cooler 200.

With reference to FIGS. 1-7, 10, and 11, during operation, first portion 162 of air 158 flows proximate to external surface 202 to exchange heat with the plurality of fin members 204. In a static or no flow operating condition of turbofan engine 100, for example, when turbofan engine 100 is shutdown is in a non-operating mode, there is little to no flow of air 158 across surface cooler 200, and therefore the plurality of fin members 204. In such an operating condition, fin arrangement 1002 of the plurality of fin members 204 is in static orientation 1004, where the plurality of fin members 204 exhibit generally no twisting or bending.

In a low flow condition of turbofan engine 100, such as a ground/idle state, first portion 162 of air 158 flows across surface cooler 200 and through gaps 1016 at a limited or reduced flow rate, thereby imparting a small amount of force on the plurality of fin members 204. The reduced flow of first portion 162 of air 158 facilitates flexing and twisting the plurality of fin members 204. For example, and without limitation, air 158 impacts the angled surfaces of fin members 204, therefore imparting bending and twisting forces on fin members 204, deflecting them from static orientation 1004 and into low flow orientation 1006. As shown in FIG. 11, a heat transfer area (or frontal area) is increased by virtue of adjacent fin members 204 twisting and bending in opposite directions due, in part, to their alternating pattern arrangement. In addition, fin members 204 bend in a direction along the airflow path of air 158, becoming streamlined with the airflow.

As the speed of turbofan engine 100 is increased, for example, and without limitation, during flight of an aircraft using turbofan engine 100, first portion 162 of air 158 flows across surface cooler 200 and through gaps 1016 at an increased flow rate, thereby imparting an increased amount of force on the plurality of fin members 204. The increased flow of first portion 162 of air 158 facilitates flexing and twisting the plurality of fin members 204 further, deflecting them from low flow orientation 1006 to high flow orientation 1008. As shown in FIG. 11, the heat transfer area (or frontal area) is further increased by virtue of adjacent fin members 204 twisting and bending in opposite directions due an increased amount, thereby exposing additional surface area of the fin members 204 further downstream. In addition, fin members 204 bend further in a direction along the airflow path of air 158, becoming increasing streamlined with the airflow as the airflow increases. As described herein, the plurality of fin members 204 are not constrained to 2-dimensional or planar bending and or axial twisting. For example, and without limitation, first portion 162 of air 158 in bypass airflow passage 156 experiences variations in the upstream flow angle from location to location, including swirl conditions. Fin members 204 bend, twist, and adapt to the flow conditions and angles, thereby facilitating reducing frictional losses and pressure losses due to channel misalignment with an upstream flow angle.

The above-described embodiments of surface coolers provide an efficient method for cooling fluids, such as oil, in a gas turbine engine. Specifically, the above-described surface coolers include a pliable pin fin arrangement that adapts to local flow and swirl angles, facilitating reducing fan air pressure losses and frictional losses. As such, reducing pressure losses and frictional losses, or drag, within the fan bypass duct increases the fuel efficiency of the gas turbine engine.

An exemplary technical effect of the systems and apparatus described herein includes at least one of: (a) forming an array of resilient and pliable pin fins for a surface cooler, leading to a structure that is adaptable to changing flow conditions; (b) reducing friction losses and pressure losses in a gas turbine engine at increased flow conditions; and (c) increasing the fuel efficiency of the gas turbine engine.

Exemplary embodiments of the surface cooler are described above in detail. The surface cooler systems and devices are not limited to the specific embodiments described herein, but rather, components of systems and/or steps of the methods may be utilized independently and separately from other components and/or steps described herein. For example, the systems and methods may also be used in combination with other systems requiring oil cooling, and are not limited to practice with only the systems and methods as described herein. Rather, the exemplary embodiment can be implemented and utilized in connection with many other machinery applications that are currently configured to receive and accept surface coolers.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A surface cooler comprising:
    a conduit defining an inlet, an outlet, and an internal flow path extending therebetween, said conduit configured to channel a flow of fluid to be cooled from said inlet to said outlet;
    a body comprising an external surface, said conduit extending through said body; and
    a plurality of fin members coupled to said external surface and configured in an array of fin members, each fin member of said plurality of fin members extending away from said external surface, said each fin member of said plurality of fin members fabricated from a thermally conductive, resilient, and pliable material, wherein said thermally conductive, resilient, and pliable material has a Young's modulus less than approximately $1 \times 10^9$ Pascal (Pa),
    wherein each fin member of said plurality of fin members includes a coupling portion configured to couple to an L-shaped locating aperture of the body.

2. The surface cooler in accordance with claim 1, wherein said array of tin members comprises a pin-fin array.

3. The surface cooler in accordance with claim 2, wherein said each fin member of said plurality of fin members comprises a substantially triangular cross-section.

4. The surface cooler in accordance with claim 1, wherein said thermally conductive, resilient, and pliable material has a Young's modulus less than approximately $1 \times 10^8$ Pa.

5. The surface cooler in accordance with claim 1, wherein said thermally conductive, resilient, and pliable material has a thermal conductivity greater than approximately 1 watt per meter kelvin (W/m-K).

6. The surface cooler in accordance with claim 5, wherein said thermally conductive, resilient, and pliable material has a thermal conductivity greater than approximately 10 W/m-K.

7. The surface cooler in accordance with claim 1, wherein said array of fin members comprises a linear fin arrangement comprising two or more fin members of said plurality of fin members, said two or more fin members arranged in an alternating pattern with respect to each other.

8. The surface cooler in accordance with claim 7, wherein said two or more fin members comprises a first fin member and a second fin member, said first and second fin members comprising a triangular-shaped cross-section, where said first tin member is rotated approximately 180° about a longitudinal axis of said first fin member with respect to said second fin member.

9. The surface cooler in accordance with claim 1, wherein said array of fin members are configured to receive a flow of a coolant in heat transfer communication with said array of fin members.

10. The surface cooler in accordance with claim 1, wherein said each fin member of said plurality of fin members is bendable between a first position, in which said fin member is oriented generally transversely to said external surface, and a second position, in which said fin member is oriented generally obliquely to said external surface.

11. The surface cooler in accordance with claim 10, wherein at least one fin member of said plurality of fin members is oriented relative to said external surface at an angle less than 70 degrees in the second position.

12. A turbine engine comprising:
    a fan assembly comprising a bypass airflow passage; and
    a core engine comprising a surface cooler comprising:
        a conduit defining an inlet, an outlet, and an internal flow path extending therebetween, said conduit configured to channel a flow of fluid to be cooled from said inlet to said outlet;
        a body comprising an external surface, said conduit extending through said body; and
        a plurality of fin members coupled to said external surface and configured in an array of fin members, each fin member of said plurality of fin members extending away from said external surface, each fin member of said plurality of fin members being fabricated from a thermally conductive, resilient, and pliable material, wherein said array of fin members extends into said bypass airflow passage, wherein said thermally conductive, resilient, and pliable material has a Young's modulus less than approximately $1 \times 10^9$ Pascal (Pa), wherein each fin member of said plurality of fin members includes a coupling portion configured to couple to an L-shaped locating aperture of the body.

13. The turbine engine in accordance with claim 11, wherein said array of fin members comprises a pin-fin array.

14. The turbine engine in accordance with claim 13, wherein said each fin member of said plurality of fin members is substantially cylindrical, thereby having a substantially circular cross-section.

15. The turbine engine in accordance with claim 12, wherein said thermally conductive, resilient, and pliable material has a Young's modulus less than approximately $1 \times 10^8$ Pa.

16. The turbine engine in accordance with claim 12, wherein said thermally conductive, resilient, and pliable material has a thermal conductivity greater than approximately 1 watt per meter kelvin (W/m-K).

17. The turbine engine in accordance with claim 16, wherein said thermally conductive, resilient, and pliable material has a thermal conductivity greater than approximately 10 W/m-K.

18. The turbine engine in accordance with claim 12, wherein said thermally conductive, resilient, and pliable material comprises at least one of a polymer seeded with thermally conductive particles and a metal.

19. The turbine engine in accordance with claim 12, wherein said array of fin members comprises a linear fin arrangement comprising a first fin member and a second fin member, said first and second fin members comprising a triangular-shaped cross-section, where said first fin member is rotated approximately 180° about a longitudinal axis of said first fin member with respect to said second fin member.

20. The turbine engine in accordance with claim 12, wherein said fan assembly is configured to supply a flow of a coolant to said bypass airflow passage, said array of fin members configured to receive the flow of a coolant in heat transfer communication with said array of fin members.

* * * * *